UNITED STATES PATENT OFFICE.

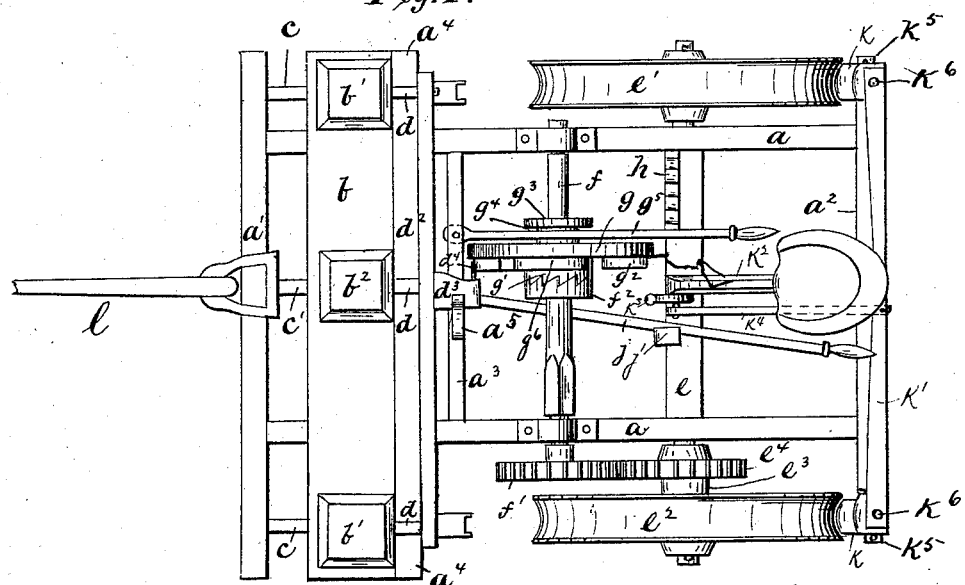

DANIEL S. DAVIS, OF VAN'S VALLEY, OHIO.

CORN-PLANTER.

SPECIFICATION forming part of Letters Patent No. 281,981, dated July 24, 1883.

Application filed September 30, 1882. (No model.)

*To all whom it may concern:*

Be it known that I, DANIEL S. DAVIS, a citizen of the United States, residing at Van's Valley, in the county of Delaware and State of Ohio, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention has relation to improvements in corn-planters; and it consists in the construction, combination, and arrangement of the several parts, substantially as hereinafter described, and specifically pointed out in the claims.

In the drawings, Figure 1 is a plan view of my machine. Fig. 2 is a vertical section of the same, and Figs. 3, 4, and 5 are detailed views, as will be described.

$a\ a$ are the side bars, $a'$ the front bar, $a^2$ the rear bar, and $a^3\ a^4$ intermediate cross-bars, forming the framing of my machine. The front bar, $a'$, the rear bar, $a^2$, and the cross-bar $a^4$ are extended on either side beyond the side bars, $a$, as shown. On the ends of the rear bar, $a^2$, I form gudgeons for the brake-shoes, hereinafter described. The front bar, $a'$, and the cross-bar $a^4$ are extended on either side to form supports for the two outer sled-runners or furrow-openers, as will be described.

$b$ is a platform supported on the side bars, $a\ a$, immediately in front of the cross-bar $a^4$.

$b'\ b'$ are the two outer and $b^2$ the middle grain-boxes, supported on the platform $b$. They are provided with holes in the front and rear, through which the grain-slide passes.

$c\ c$ are the two outer and $c'$ the middle sled-runners. Their forward ends are secured to the front bar, $a'$, and are curved down to the ground and extended back to a point in rear of the grain-boxes. Their base-piece is cut away at the rear, and the standard $c^2$ of the runners is made hollow from top to bottom, opening into a hole formed through the cross-bar $a^4$, into which the corn is delivered from the grain-slide hereinafter described.

$d\ d$ are the grain-slides, which work through openings in the front and rear of the grain-boxes. They are provided with holes $d'$, which are filled with the grain while in the boxes, and as the slides are drawn back the grain in the holes $d'$ is carried to and delivered into the holes through the cross-bar $a^4$, and is thence conveyed into the ground through hollow standards $c^2$ of the sled-runners, before described.

$d^2$ is a bar connected to the rear end of each of the grain-slides, as shown.

$d^3$ is a short bar extended rearward from the bar $d^2$, about midway between the side bars, $a\ a$, and under a guide, $a^5$, projected up from bar $a^3$, as shown.

$d^4$ is a short rod or pin extended at right angles from one side of the bar $d^3$. An anti-friction-roller is placed on the rod $d^4$. This rod, with its friction-roller, is engaged by the cams hereinafter described, and is given the reciprocating motion, which is conveyed through the described intermediate mechanism to the grain-slides.

$e$ is the axle supporting the side bars, $a\ a$.

$e'\ e^2$ are the main wheels supported on the said axle. They are arranged immediately in rear of the delivery-spouts from the two outer grain-boxes, and their peripheries are made concave, as shown, as by this construction the ground is better covered over the planted seed and better results are obtained than by the ordinary flat tread. The hub of the wheel $e^2$ is extended toward the side bar, $a$, to provide the portion $e^3$, on which is fixed the gear-wheel $e^4$, which receives its motion from the revolutions of wheel $e^2$.

$f$ is a shaft journaled in the side bars, $a\ a$, in advance of the axle $e$, as shown. $f'$ is a gear-wheel fixed on the shaft $f$, and meshed with the gear-wheel $e^4$, by means of which the shaft $f$ is revolved in the operation of the machine. $f^2$ is a clutch-wheel secured on shaft $f$.

$g$ is a wheel sleeved on shaft $f$ and provided with the clutch $g'$, which is arranged to be engaged with or held clear of clutch $f^2$ by mechanism hereinafter described.

The propelling and retracting cams $g^2\ g^6$ are arranged in sets or pairs, and are secured to and projected laterally from the vertical face of the wheel $g$, and arranged tangentially to an imaginary circle drawn concentric with the wheel $g$, and so that they will alternately engage the roller or rod $d^4$, the said rod being engaged by the inner and outer face of the alternate cams $g^2$ $g^6$, the former propelling or throwing the several dropping slides forward and the latter retracting or drawing them back in the operation of the machine, as will be described. Thus when the parts are in the position shown in Fig. 2 the wheel $g$ is revolved in the direction of the arrows, and the rod $d^4$ is engaged first by the inner and straight face of the cam marked $x$ and drawn back, and then is engaged by the outer or curved face of the cam marked $y$ and forced forward. I have only shown four of these cams; but it will be understood that more could be supplied, and when so desired my machine could be made to act as a drill by multiplying these cams. The cams $g^2$ $g^2$ are arranged on opposite sides of and near to the axle $f$, or center of motion of the wheel $g$, and they give the forward movement to the slides. The cams $g^6$ alternate in position with the cams $g^2$, and are arranged near the periphery of the wheel $g$, and they catch the pin $d^4$ and draw the slide back or rearward. By this arrangement the power or force for operating the grain-slides is exerted in a line at right angles to the shaft $f$, and thereby the liability to breakages or to get out of order is obviated.

$g^3$ represents an extension of the wheel $g$ on the opposite side from the clutch $g'$. In this extension I cut the annular groove $g^4$.

$g^5$ is a lever pivoted on cross-bar $a^3$, so it can swing laterally, and it is extended back, resting in groove $g^4$, and its rear end is passed over rack-bar $h$, which is mounted on axle $e$. By this lever the wheel $g$ may be moved laterally, so that the clutch $g'$ is held in contact with or away from the clutch $f^2$, the lever being held in any suitable position desired by means of the rack-bar $h$.

$i$ $i$ are short bars pivoted on opposite sides of the middle sled-runner, $c'$, at about the point where the base and standard join, as shown in Fig. 4. These bars are arranged so they may swing under the runner $c'$, and are connected by a cross-bar, $i'$, arranged so that it will swing far enough below the base of the runner to permit the insertion of the lever hereinafter described.

$i^2$ is a caster or covering wheel, pivoted between the bars $i$ $i$ at the lower end thereof. This wheel runs in the track of the runner $c'$, and its periphery, like that of the wheels $e'$ $e^2$, is made concave. I make the wheels $e'$, $e^2$, and $i^2$ wider than the runners they follow, as a better covering of the grain is thus secured.

$j$ is a lever for operating the caster-wheel $i^2$. Its forward end is inserted between the cross-bar $i'$ and the under side of the runner $c'$, as shown in Fig. 4, and when its lower end is depressed the caster $i^2$ is forced to a point below the level of the runner $c'$, raising the runners and throwing the weight of the forward part of the machine onto the caster-wheel. The rear part of the lever $j$ may be held by the driver's foot; but I prefer to use a hook or catch, $j'$, which is secured on the axle $e$, as shown, in position to receive the lever from one side.

It will be understood that, instead of the lever $j$, the caster $i^2$ could be depressed by other means, such as a bar secured to it and extending vertically upward and connected to an operating-lever arranged to engage a rack-bar. I prefer, however, the construction shown and described, as the lever is thus arranged in convenient reach of the operator, and the arrangement is such that the weight of the driver will readily raise the forward part of the machine and throw its weight on the caster-wheel $i^2$. This transferral of the weight of the front of the machine from the runner to the caster-wheel is useful in turning the machine at the end of a row, and also in transporting it from place to place on the roads or fields.

$k$ $k$ represent the brake-shoes journaled on the ends of the back bar, $a^2$, and having their lower portion made convex and bearing in the concave peripheries of wheels $e'$ $e^2$, and their upper portion extended slightly above the back bar, $a^2$, and connected by the bar $k'$, as shown.

$k^2$ is the seat-bar supporting the driver's seat.

$k^3$ is a lever pivoted on the seat-bar at a point above and in rear of the front side of axle $e$. The lower arm of this lever is carried forward and bent down in front of the axle $e$, forming a stop, and its upper or handle arm is carried forward and bent up within reach of the driver.

$k^4$ is a connecting-rod pivoted to the lever $k^3$ at a point slightly above and in advance of the pivotal point of said lever, and carried back and secured to bar $k'$, thus operating the brake-shoes with the movement of the lever $k^3$; and the wheels can be cleared of dirt and the machine braked, as may be desired. $l$ is the tongue of the machine.

The operation of my invention will be readily understood on reference to the drawings and the description hereinbefore given.

Having thus described my invention, what I claim, and desire to secure by Letters Patent, is—

1. In a corn-planter, the combination of a wheel, $g$, suitably geared with and operated by the driving mechanism, propelling and retracting cams, $g^2$ $g^6$, arranged in a vertical plane on the face of the wheel $g$, and formed with bearing-surfaces on respectively their outer and inner sides, and inclined alternately in opposite directions, as described, dropping-slides $d$, working through their respective seed-boxes, connecting bar $d^2$, and bar $d^3$, having laterally-projected pin or extension $d^4$, arranged in position to be engaged alternately by the outer side of cam $g^2$ and inner side of cam $g^6$, whereby the several dropping-slides are given a reciprocating motion in the line of motion of the machine, substantially in the manner and for the purposes set forth.

2. The combination, with the frame $a$, having its rear end supported on the axle $e$, and the openers $c\ c'$, fixed to and supporting the forward end of the frame $a$, of a wheel, $i^2$, and arms $i$, pivoted to the lower end of the middle opener, $c'$, and means whereby the wheel $i^2$ may be forced downward and forward under the opener $c'$, thereby elevating the forward end of the frame and lifting the openers out of and clear of the ground, substantially as set forth.

3. The combination, with the axle $e$, spindled in the wheels $e'\ e^2$, the frame $a$, having its rear end fixed upon and supported by the axle $e$ and its forward end supported upon the openers $c\ c'$, of the arms or bars $i$, united near their rear ends by a cross-bar, $i'$, and having a roller, $i^2$, journaled in their rear ends, and having their forward ends pivoted on opposite sides of the lower end of the middle opener, $c'$, and the lever $j$ fulcrumed on the cross-bar $i'$, and its lower end bearing under the lower end of the opener and its rear end arranged within easy reach of the driver, substantially as set forth.

4. The combination, with the axle $e$, having the wheels $e'\ e^2$ spindled thereon, and the frame $a$, fixed to the axle $e$, and carrying the grain-boxes on its forward end, of the gear $e^4$, fixed to the hub of the wheel $e^2$, the shaft $f$, journaled on the frame $a$ between the axle $e$ and the grain-boxes, and provided with gear-wheel $f'$, meshing with gear-wheel $e^4$, the wheel $g$, keyed on shaft $f$, propelling and retracting cams $g^2\ g^6$, secured in a vertical plane on the face of the wheel and inclining alternately in opposite directions, as described, and the dropping-slides $d$, connecting-bar $d^2$, and bar $d^3$, having laterally-projected pin or extension $d^4$, arranged in position to be engaged alternately by the outer side of cam $g^2$ and inner side of cam $g^6$, whereby the several dropping-slides are given a reciprocating motion through their several seed-boxes in the line of direction of motion of the machine, substantially in the manner and for the purposes set forth.

In testimony whereof I affix my signature in presence of two witnesses.

DANIEL S. DAVIS.

Witnesses:
   DAVID BROOKS,
   C. H. RICE.